United States Patent
Wilkinson

[15] 3,657,653
[45] Apr. 18, 1972

[54] PULSE CODE MODULATION SYSTEM

[72] Inventor: Roger Martin Wilkinson, Christchurch, England

[73] Assignee: Minister of Technology in Her Britannic Majesty's Government of the United Kingdom of Great Britain and Northern Ireland, London, England

[22] Filed: Apr. 27, 1970

[21] Appl. No.: 32,322

[30] Foreign Application Priority Data

Apr. 30, 1969 Great Britain ......................22,042/69

[52] U.S. Cl. ..............................325/38 B, 178/68, 325/321, 340/347

[51] Int. Cl. ....................................................H03k 13/22

[58] Field of Search......................325/38 R, 38 B, 321, 324; 340/347 AD; 178/68

[56] References Cited

UNITED STATES PATENTS 3,065,422 11/1962 Villars............................340/347 AD
2,916,553 11/1959 Crowley..............................325/38 B
3,462,686 8/1969 Shutterly.............................325/38 B

*Primary Examiner*—Benedict V. Safourek
*Attorney*—Hall, Pollock & Vande Sande

[57] ABSTRACT

A pulse code telecommunications system in which samples of an analogue signal to be transmitted are each represented by a binary word. In each binary word, one signal bit represents the polarity of the sample with respect to a reference level and one or more further signal bits represent the magnitude of the sample with respect to a second, variable, reference level which is derived from the coded representation of the magnitudes of preceding samples. The system includes a binary signal multiplexer and a transmitter.

A receiver for use with the system includes a binary signal demultiplexer, circuits for correctly allocating the polarity and magnitude bit signals to polarity and magnitude signal channels, and decoder circuits for reconstituting the analogue signal from the binary word signal.

15 Claims, 7 Drawing Figures

Roger Martin Wilkinson
Inventor

Hall, Pollock & Vande Sande
Attorneys

Roger Martin Wilkinson
Inventor

Hall, Pollock & Vande Sande
Attorneys

Roger Martin Wilkinson
Inventor
Hall, Pollock & Vande Sande
Attorneys

Roger Martin Wilkinson
Inventor

Hall, Pollock & Vande Sand
Attorneys

Roger Martin Wilkinson
Inventor

Hall, Pollock & Vande Sand
Attorneys

Roger Martin Wilkinson
Inventor
Hall, Pollock & Vande Sande
Attorneys

Roger Martin Wilkinson
Inventor

Hall, Pollock & Vande Sande
Attorneys

PULSE CODE MODULATION SYSTEM

BACKGROUND OF THE INVENTION

The present invention relates to telecommunication systems which use a digital code for transmitting analogue signals.

Some known systems of this kind may be classified as pulse coding systems; they periodically sample the analogue signal to be transmitted, and generate digital code signals to represent the magnitude of each sampled value of the analogue signal. There is an inherent limitation in the range of signal amplitudes which any one channel can transmit satisfactorily, due to the practical limits on the rate at which the analogue signal can be sampled and on the rate at which the code signals can be transmitted and to the fact that each sampled magnitude can only be represented by one out of a predetermined set of code signals. Most systems use binary signals. Although there are various ways of reducing the approximations inherent in pulse-coding, they usually involve rather elaborate coding systems. For example each sample may be represented by a word comprising perhaps five or more binary digit-signals. This extends the range of magnitudes which can be transmitted with satisfactory accuracy, at the cost of increasing the number of binary signals required to transmit a given signal and also considerably increasing the complexity of the system. Moreover, some extra synchronising signals will generally have to be transmitted to prevent confusion of the significance of the digit-signals.

An alternative approach to the problem has produced the class of delta-modulation delta-sigma-modulation systems, in which a smoothed form of the digital output signal is continuously compared with the analogue input signal, and one-bit signals are generated periodically according to the instantaneous differences found between the input signal and the smoothed output (feedback) signal. In effect, these systems generate one-bit binary signals representing the sense of increments in the analogue signal. In the sub-class of adaptive delta-modulation systems, devices known as compandors are inserted in the feedback circuit, which vary the energy content of the feedback signals in accordance with a control signal derived from the binary output signals. In effect, they vary the amplitude of the feedback signals in accordance with the amplitude of the envelope of the analogue input signal, which extends the range of analogue signals which can be satisfactorily transmitted. The term envelope in this context means for example the syllabic undulations in a speech waveform analogue signal. However, even with such adaptive delta-modulation systems, delta modulation systems which transmit just one bit per sample are limited in the quality of the information which can be transmitted at a given bit rate. Any attempts to extend the capabilities of such systems by generating signals of more than one bit to represent each instantaneous value of the difference between the input signal and the feedback signal would appear to involve vary considerable complications, and to require some extra synchronizing signal to be transmitted to prevent confusion of the significance of the bit-signals; these would be severe and obvious disadvantages.

SUMMARY OF THE INVENTION

It is an object of the present invention to provide a relatively simple pulse-code transmission system wherein at least two bit-signals are transmitted for each sample, and an adaptive action is provided, but no extra synchronizing signals are required.

According to the present invention there is provided a telecommunications system for transmitting analogue signals, which includes sampling means for taking samples of an analogue signal to be transmitted; pulse-coding means for generating digital word signals comprising a word of at least two binary-digit signals to represent each sample taken, so that one of the binary-digit signals represents the sign of the difference between the magnitude of the sample and a predetermined magnitude, and the remainder of the word forms a quantized digital representation of the magnitude of the modulus of the said difference; and including means for deriving a reference signal from an average of the values of successive ones of the quantized digital representations, connected to control the pulse coding means so that the quantized digital representations will be quantized in terms of the said reference signal. Receivers in the system will include switching means for directing one binary signal from each word into a first channel and the other signals into another channel, and threshold means responsive to the mean level of signals applied to at least one of the channels for controlling the switching means to make it alter the selection of the signals applied to the first channel whenever the said mean level varies beyond a predetermined range of values, and means for reforming the signal according to samples of polarity determined by the signals directed through the first channel and of magnitude determined by the signals in the other channel.

In one form of the system the samples are represented by pairs of binary signals of which a first binary signal represents whether or not the magnitude of the sample is greater or less than a predetermined level and a second binary signal represents whether or not the modulus of the difference between the magnitude and the predetermined level is greater or less than a reference level derived from the mean value of the second binary signals generated; and each receiver includes switching means for receiving the binary signals and directing them through a first channel and a second channel, of which the first channel should receive the first binary signals and the second channel should receive the second binary signals, threshold means for responding to the mean level of signals in the first channel whenever the said mean level exceeds a predetermined threshold level, by acting on the switching means to reverse the allocation of the signals to the first channel and the second channel, filter means for generating a decoder reference voltage which will vary as the mean level of signals received through the second channel, and decoder means for generating a pulse for each pair of the binary signals received, when the polarity of the pulse is determined by the binary signal received through the first channel, and the magnitude of the pulse is made to have one or the other of two variable values according to the binary signal received through the second channel the said variable values depending on the decoder reference voltage. These pulses may be smoothed and filtered to provide a reproduction of the original signal sampled at the transmitter.

Transmitters in this form of the system may include a first differential amplifier having a signal input and first reference input, a second differential amplifier having a signal input and a second reference input, and a third differential amplifier having a signal input and a third reference input, of which all the signal inputs are connected to receive the analogue signal of which a representation is to be transmitted, the second reference input is connected to a predetermined voltage level (for instance ground potential), the first reference input is connected to receive the reference level, and the third reference input is connected to receive an inverted form of the reference level such that the voltages on the first and third reference inputs are always equidistant from the predetermined voltage; and there may be first and second sample-and-hold circuits, the first sample-and-hold circuit being connected to the output of the second differential amplifier, and the second sample-and-hold circuit being connected by an OR-gate to the outputs of the first and third differential amplifiers, all connected to sample the said outputs simultaneously so that the output of the first sample-and-hold circuit forms the said first binary signal and the output of the second sample-and-hold circuit forms the said second binary signal. A simple resistance-capacitance smoothing and filter circuit may be used to derive the reference signal from the second binary signals. The transmitter includes means for transmitting the first binary signals and the second binary signals alternately, and the switching means in the receiver is arranged to apply received binary signals alternately to the first channel and to the second channel. The threshold means may include a resistance-capacitance smoothing and filter circuit connected to receive the signals applied to the first channel and a pulse generator circuit connected to be inhibited whenever the filter circuit develops an output within a predetermined range and connected to apply a pulse to the switching means to cause the received binary signals to be applied to the opposite channels whenever the filter circuit develops an output outside the predetermined range. A simple resistance-capacitance filter and smoothing circuit may be used to derive the decoder reference voltage from the signals in the second channel.

The decoder means in each receiver may include four AND-gates respectively responsive to the four different possible combinations of a pair of binary signals, four amplifier input circuits each controlled by a separate one of the AND-gates, means for feeding the decoder reference voltage through two of the said input circuits and a fraction of the decoder reference voltage through the other two input circuits.

The receiver may include in one of its channels a sample-and-hold circuit for delaying the binary signals therein, to restore the coincident relative timing of the binary signals of each pair of binary signals.

In this form of the invention each sample of the analogue signal (which will generally be a speech signal) is converted into digital form by means of the three differential amplifiers which are arranged to determine the polarity of the signal with respect to ground and its amplitude with respect to a reference voltage. When a positive excursion of the input signal occurs the first amplifier output will take up a polarity state representing a positive sample, and when a negative excursion occurs the amplifier output changes over to the opposite polarity state. Similarly when the input signal is positive and greater than the reference voltage the output of the second amplifier takes a particular polarity state, and it switches to the opposite state when the signal falls below the reference voltage. The input signal is also compared with an inverted form of the reference voltage in a third amplifier so that digital indications of its negative excursions are also produced. The outputs of the second and third comparator amplifiers are logically combined and their combined output is sampled simultaneously with the output of the polarity comparator.

Thus, binary signals representing polarity and amplitude samples are generated by simultaneous comparisons, and they are transmitted alternately.

The analogue signal is reconstituted from these binary samples by decoders and suitable filters. The degree of correspondence between the original signal and the reconstituted signal will depend on, among other factors, the level of the reference voltage. In the present invention the reference voltage is arranged to vary in accordance with the syllabic undulations of the input speech signal and this gives satisfactory reproduction over a range of amplitude variations of the signal to be transmitted, exceeding the range which can be accommodated satisfactorily by a conventional system transmitting one bit per sample. This leads to a closer correspondence between the input speech signal and the reconstituted signal.

In other forms of the invention, the binary word signals generated for each sample include at least three binary digit-signals of which one represents the sign of the difference between the sample magnitude and a predetermined magnitude, as hereinbefore described, while the remaining (at least two) binary digit-signals represent the magnitude of the modulus of the difference.

BRIEF DESCRIPTION OF THE DRAWINGS

Embodiments of the invention will now be described by way of example only, with reference to the accompanying drawings of which.

DESCRIPTION OF THE PREFERRED EMBODIMENTS

Figure 1:
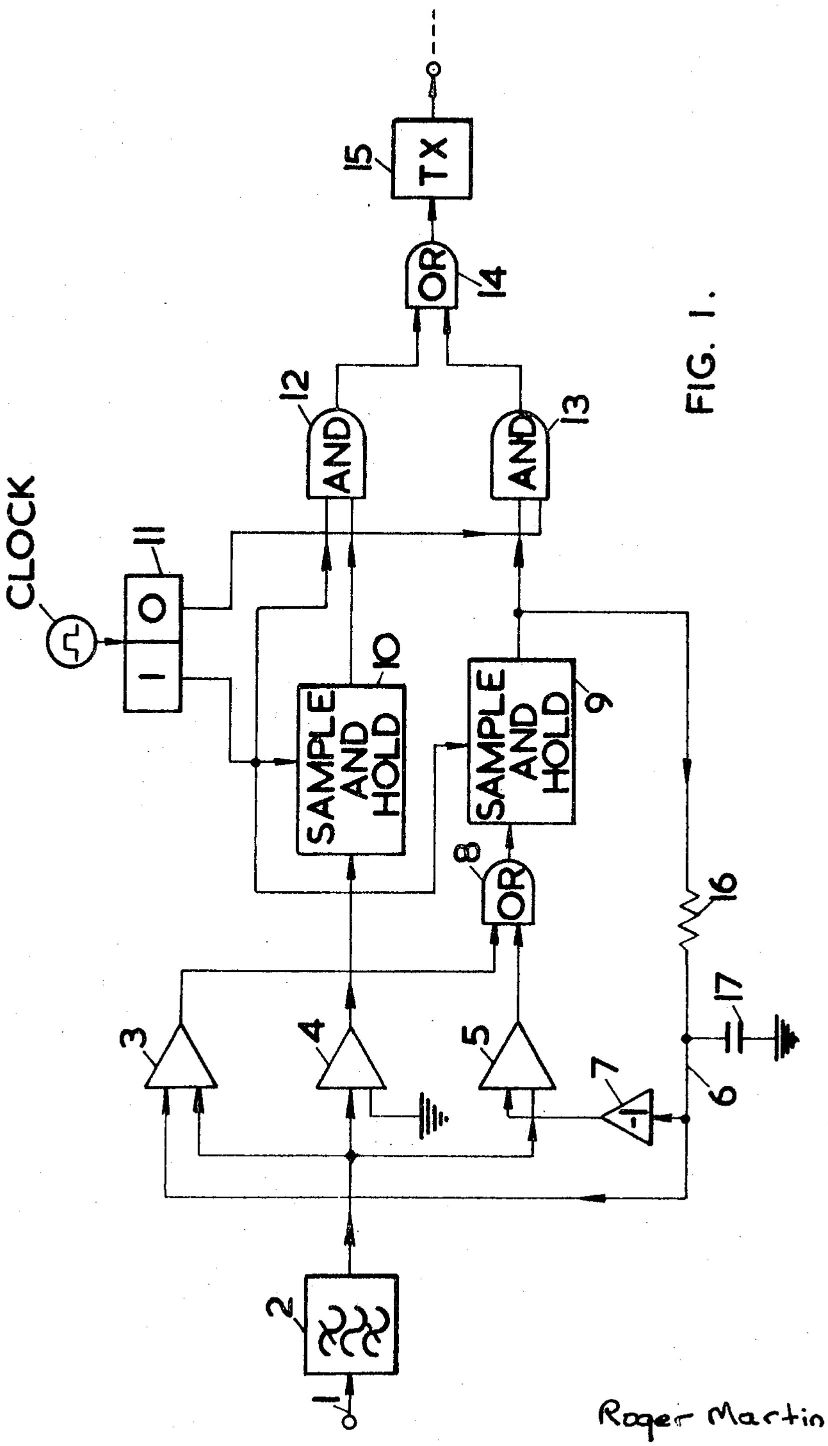
FIG. 1 is a block circuit diagram of transmitting apparatus in a pulse code modulation telephony system.

FIG. 1 shows a speech signal input 1 connected via a filter 2 to the signal input connections of three comparator amplifiers 3, 4 and 5. The reference input of the comparator amplifier 3 is connected to a reference voltage supply line 6. The reference input of the amplifier 5 is connected to receive an inverted form of the reference voltage from the line 6 via an inverting amplifier 7. The outputs of the amplifiers 3 and 5 are connected via an OR-gate 8 to the signal input of a sample-and-hold circuit 9. The amplifier 4 has its reference input grounded and its output connected to the signal input of a sample-and-hold circuit 10. The strobing inputs of the sampling circuits 9 and 10 are connected to the one state output of a bistable trigger circuit 11 and to one input of an AND-gate 12. The zero-state output of the bistable circuit 11 is connected to one of the inputs of an AND-gate 13. The output of the sampling circuit 9 is connected to the other input of the AND-gate 13. The output of the sampling circuit 10 is connected to the other input of the AND-gate 12. The outputs of the AND-gates 12 and 13 are connected respectively to two separate inputs of an OR-gate 14. The output of the OR-gate 14 is connected to a modulation input of a transmitter 15. A train of pulses from a clock pulse generator is connected to a switching input of the bistable circuit 11. The output of the sampling circuit 9 is connected to the line 6 via an integrating circuit comprised of a resistor 16 and a capacitor 17.

The mode of operation of the circuit of FIG. 1 is as follows.

A speech input signal is filtered in the filter 2 to remove frequency components below 250 HZ and above 2.4 KHz. The response of this filter falls off very sharply at frequencies above 2.4 KHz. The resulting speech signal is compared in the comparator amplifiers 3, 4 and 5 with the reference voltage levels +V, ground and −V respectively. The output of the amplifier 4, which may be called the polarity amplifier, will take up one of two possible states which will be termed one and zero depending on whether the input signal has positive or negative polarity respectively with respect to ground. Similarly the outputs of the comparator amplifiers 3 and 4 will take up one of two possible states also designated one and zero depending on whether the instantaneous level of the input speech signal is greater or less than +V volts or more or less negative than −V volts respectively. The outputs of the amplifiers 3 and 5 are logically combined in an OR-gate 8 to produce an output state which will be either a one level or a zero level. It will be one when the speech signal is either more positive than +V or more negative than −V, and it will be at the zero level when the signal is between +V and −V volts.

The sample-and-hold circuits 9 and 10 sample the logical state of their respective inputs at regular intervals, that is to say their input signals are passed to the outputs of the circuits when the bistable circuit 11 sends a one state signal to the strobing inputs of the sample circuits 9 and 10. These output signals are held until the next one state signal arrives from the bistable circuit 11. As one of the inputs of the AND-gate 12 is also supplied with the same one state signal, then the output of that gate will have the same logical state as the output of the sample circuit 10. The two outputs of the bistable circuit 11 are symmetrical complementary waveforms in antiphase with each other. The half period of these waveforms defines the sampling period and the duration of each digital bit signal transmitted.

The AND-gate 13 has one of its inputs connected to the complementary output of the bistable 11 and therefore can only produce a logical one output during the half period immediately after each sampling half period. The sample circuit 9 holds each sample output for a whole period so that any one level output from the amplifiers 3 or 5 is transmitted to the OR-gate 14 a half period later than the corresponding sample of the output of the amplifier 4. Thus although polarity and amplitude samples are taken simultaneously their logical indications are supplied alternately to the modulation input of the transmitter 15.

In the present embodiment the sampling rate is 4,800 samples per second and since two digital bit signals are transmitted for each sample the signal transmission rate is 9.6 kilobits per second.

The signal outputs of the sampling circuits 10 and 9 will be called hereinafter the polarity channel and the amplitude channel respectively. The ones and zeros in the polarity channel will correspond substantially to the changes of polarity of the input speech signal, and hence will indicate its frequency or tone. The ones and zeros of the amplitude channel indicate the variations in amplitude of the input signal in relation to the reference voltage +V and −V. It follows that the level chosen for +V will have considerable effect on the degree of correspondence between the amplitude variations of the input signal and the amplitude variations which are represented by the succession of ones and zeros in the amplitude channel. In the present embodiment the reference voltage V is derived from the amplitude channel by means of an integrating circuit (16 and 17) of suitable time constant (e.g., 10 milliseconds). The voltage V then substantially forms a replica of the syllabic amplitude variations of the input speech signal, and it provides a reference voltage for the comparator amplifiers 5 and 6 which automatically varies to suit the undulations of the speech signal. Hence the digital output signal from the amplitude channel carries a more accurate representation of the input speech signal strength than would be obtained if the reference voltage were constant.

Figure 2:
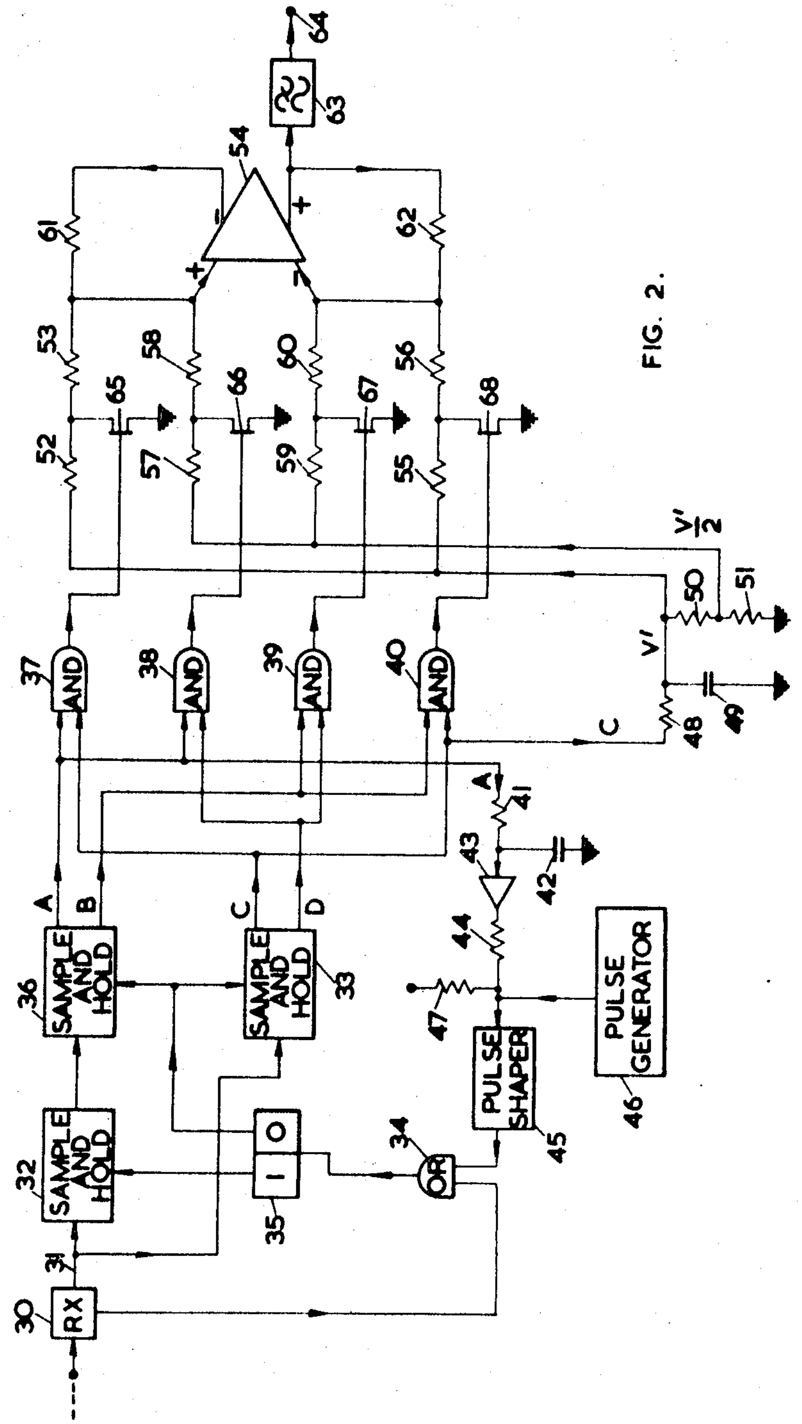
FIG. 2 is a block circuit diagram of receiving apparatus for use in conjunction with the transmitting apparatus of FIG. 1.

FIG. 2 shows a circuit for decoding the speech signal from the polarity and amplitude digital signals received from the apparatus of FIG. 1.

In FIG. 2 a receiving apparatus 30 has an output 31 which supplies the received digital bit signals to the signal inputs of two sample-and-hold circuits 32 and 33. A second output of the receiver 30 is connected to one input of an OR-gate 34. The output of the OR-gate 34 is connected to the switching input of a bistable trigger circuit 35. The one state output of the bistable 35 is connected to the strobing input of the sample-and-hold circuit 32. The zero state output of the bistable circuit 35 is connected to the strobing inputs of the sample-and-hold circuits 33 and 36. The output of the sample-and-hold circuit 32 is connected to the signal input of the sample-and-hold circuit 36.

The sample-and-hold circuit 36 has complementary outputs A and B. The output A is connected to one input of an AND-gate 37 and to one input of an AND-gate 38. The output B is connected to one input of an AND-gate 39 and to one input of an AND-gate 40. The sample-and-hold circuit 33 has complementary outputs C and D. The output C from the circuit 33 is connected to the second input of the AND-gates 37 and 40. The output D is connected to the second input of AND-gates 38 and 39.

The output A of the sample-and-hold circuit 36 is also connected to a simple integrating circuit comprised of a resistor 41 and a capacitor 42. The junction of the resistor 41 and capacitor 42 is connected through an amplifier 43 and a resistor 44 to an input of the pulse shaping circuit 45. The output of the pulse shaping circuit 45 is connected to another input of the OR-gate 34. The output of a pulse generator 46 is also connected to the input of the pulse shaper 45. A resistance 47 is connected between a negative power supply (not shown) and the output of the pulse generator 46.

The output C of the sample-and-hold circuit 33 is also connected to the input of a simple integrating circuit comprised of a resistor 48 and a capacitor 49. Two resistors 50 and 51 are connected in series between the output of the integrating circuit and ground. The junction of the resistor 50 with the capacitor 49 is connected via two resistors 52 and 53 in series, to the positive input of a differential operational amplifier 54, and also to the negative (i.e., complementary) input of the amplifier 54 via two resistors 55 and 56 in series. The junction of the resistors 50 and 51 is connected via two resistors 57 and 58, in series, to the positive input of the amplifier 54 and also to the negative input of the amplifier 54 via two resistors 59 and 60 in series. The negative output of the amplifier 54 is connected via a resistor 61 to its positive input, and the positive output is connected via a resistor 62 to the negative input. The positive output of the amplifier 54 is also connected via a low pass filter 63 to an audio output terminal 64.

The junctions of the resistors 52 and 53, 57 and 58, 59 and 60 and 55 and 56 are respectively connected via field effect switching transistors 65, 66, 67 and 68 to ground. The control inputs of the transistors 65, 66, 67 and 68 are respectively connected to the outputs of the AND-gates 37, 38, 39 and 40.

The operation of the circuit of FIG. 2 will now be described.

The receiver 30 receives the digital signals from the transmitting apparatus of FIG. 1, and supplies a stream of received binary signals to the circuits 32 and 33. It also supplies synchronizing pulses to the switching input of the bistable circuit 35 via the OR-gate 34. The one state output line of the bistable circuit 35 is intended to have a logical one signal when the digital bit signal on the receiver output 31 is a polarity bit. The sample-and-hold circuits 32, 33 and 36 are constructed to hold each of their output signals until the arrival of the next strobing pulse from the bistable circuit 35, so that each signal is held for two bit periods. The sample-and-hold circuit 36 applies signals to the polarity channel while the circuit 33 applies signals to the amplitude channel.

The holding action of the sample-and-hold circuit 32 delays the signals applied to the polarity channel by one bit period. The latter half of the polarity signal applied to the sample circuit 36 will therefore be coincident with the amplitude bit signal applied to the sample circuit 33. The arrival of the amplitude bit signal coincides with the transition of the bistable 35 which now supplies a one signal to the strobing inputs of the sample-and-hold circuits 33 and 36. Signals comprising one polarity bit and one amplitude bit are therefore simultaneously transferred to the respective outputs of the circuits 33 and 36.

It would of course be quite likely that the one-state output signals of the bistable 35 would be in anti-phase relationship with the arrival of the polarity bit signals at the output 31. This would cause the polarity signals to be routed through the amplitude channel and the amplitude signals to be routed through the polarity channel. A means for automatically correcting any such error will now be described.

The outputs of the sample-and-hold circuits will have one of two values, 0 volts or 5 volts positive, corresponding to logical zero or logical one respectively. The outputs of the polarity channel will substantially consist of equal numbers of ones and zeros when the bistable circuit 35 is correctly synchronized with the polarity bit signals, thus having a mean level of about 2.5 volts.

The output A is connected to the input of the amplifier 43 via an integrating circuit. The time constant of the integrator (about 30 milliseconds in this embodiment) is chosen so that the input of the amplifier 16 is held at the mean level of the signal at A which is approximately +2.5 volts when the bistable is correctly synchronized. The resistors 44 and 47 are chosen so that the output of the amplifier 43 under these conditions produces a potential of substantially 0 volts at the input to the pulse shaper 45 which may be a simple differentiating circuit. The pulse generator 46 is held inoperative in this condition. If now for any reason the system gets incorrectly synchronized to the wrong channel, the waveform of the signal at A will no longer be symmetrical and the mean voltage at the input of the amplifier 43 will fall. The output of the amplifier 43 will then rise and this will allow the pulse generator 46 to operate, generating a pulse. The positive-going edge of this pulse will cause the pulse shaper 45 to apply a pulse to the trigger input of the bistable 35 via the OR-gate 34. The bistable 35 will then change its state, thus coming into correct synchronism with the received polarity-bit signals. The voltage at the input of the amplifier 43 will be restored to about 2.5 volts and the pulse generator 46 will be rendered inoperative. The period of the waveform generated by the generator 46 is chosen so that the voltage at the input of the amplifier 43 will have time to take up its normal steady value before a further positive signal can be supplied to the bistable 35 by the generator 46.

If a pulse generated by the generator 46 were to coincide with a clock pulse then no change would occur in the sequence of pulses in the output of the bistable 35 and the synchronization would not be corrected. The generator 46 would therefore remain operative and apply a further pulse to the bistable 35. This further pulse will not coincide with a clock pulse because the period of the generator 46 is not a multiple of the clock period.

The output C of the sample circuit 33 is connected to an integrating circuit formed by the resistor 48 and capacitor 49 which has a similar time constant to the integrating circuit (16, 17) of FIG. 1. The pulse sequence produced at the output C is substantially identical to that existing at the output of the sample-and-hold circuit 9 of FIG. 1 so that the voltage $V^1$ developed across the capacitor 49 will be similar in its variations to the reverence voltage V of FIG. 1. The resistors 50 and 51 are equal so that the voltage supplied to the resistors 57 and 59 is substantially half that supplied to the resistors 52 and 55.

The AND-gates 37 to 40 are each connected to produce a positive output signal and switch off their respective field effect transistors 66 to 68 when their inputs are simultaneously positive. Only one of the AND-gates 37 to 40 will have both inputs positive at any given instant. The normal condition of three of the switching transistors 65 to 68 is therefore ON, and in this condition they effectively short-circuit any signals present at the junctions of the pairs of resistors to which they are connected. Therefore no signal can be applied to the inputs of the amplifier 54 via those resistors.

The amplification of the differential operational amplifier 54 is determined by the ratio of the resistor 62 to the resistors 59 and 60 or to the resistors 55 and 56 and to the ratio of the resistor 61 to the resistors 52 and 53 or to the resistors 57 and 58. A signal applied to the positive input terminal will result in equally amplified versions of the signal appearing at the two outputs. The output at the positive terminal will have the same polarity as the input signal while the output at the negative terminal will have the opposite polarity. If the same input signal is applied to the negative input terminal, then the output signals will have the same amplitude as before but their polarities will be reversed. The voltages $V^1$ or ½ $V^1$ therefore will be amplified and inverted by the amplifier 54 and supplied to the filter 63 when the output A has positive polarity, and will be amplified only and supplied to the filter 63 when the output B has positive polarity. Thus the polarity of the output of the amplifier 54 will follow the polarity of the cycles of the original speech signal applied to the input of the amplifier 4 of FIG. 1. The logical combination of one state signals from the outputs A and C or B and C will result in the signal $V^1$ being amplified in the amplifier 54 and the combinations A and D or B and D will result in the smaller signal ½ $V^1$ being amplified.

When the amplitude of the input signal to the apparatus of FIG. 1 is greater than a predetermined value the amplitude samples will give rise to logical one signals being supplied to the transmitter, and it is arranged that these will produce logical one signals at the output C of the sample circuit 33 of FIG. 2. Likewise when the signal amplitude is less than a predetermined value the output C will produce a logical zero signal and the output D will take up the logical one state instead. Thus the logical state of the outputs C and D determine which of the two voltages $V^1$ or ½ $V^1$ is to be amplified. The output of the filter 63 smoothes the signal output of the amplifier 54, thereby forming a reproduction of the speech signal. The low pass filter 63 has a sharp high-frequency cut-off at 2.4 KHz.

An alternative form for the de-multiplexer part of the apparatus of FIG. 2 will now be described with reference to FIG. 3.

Figure 3:
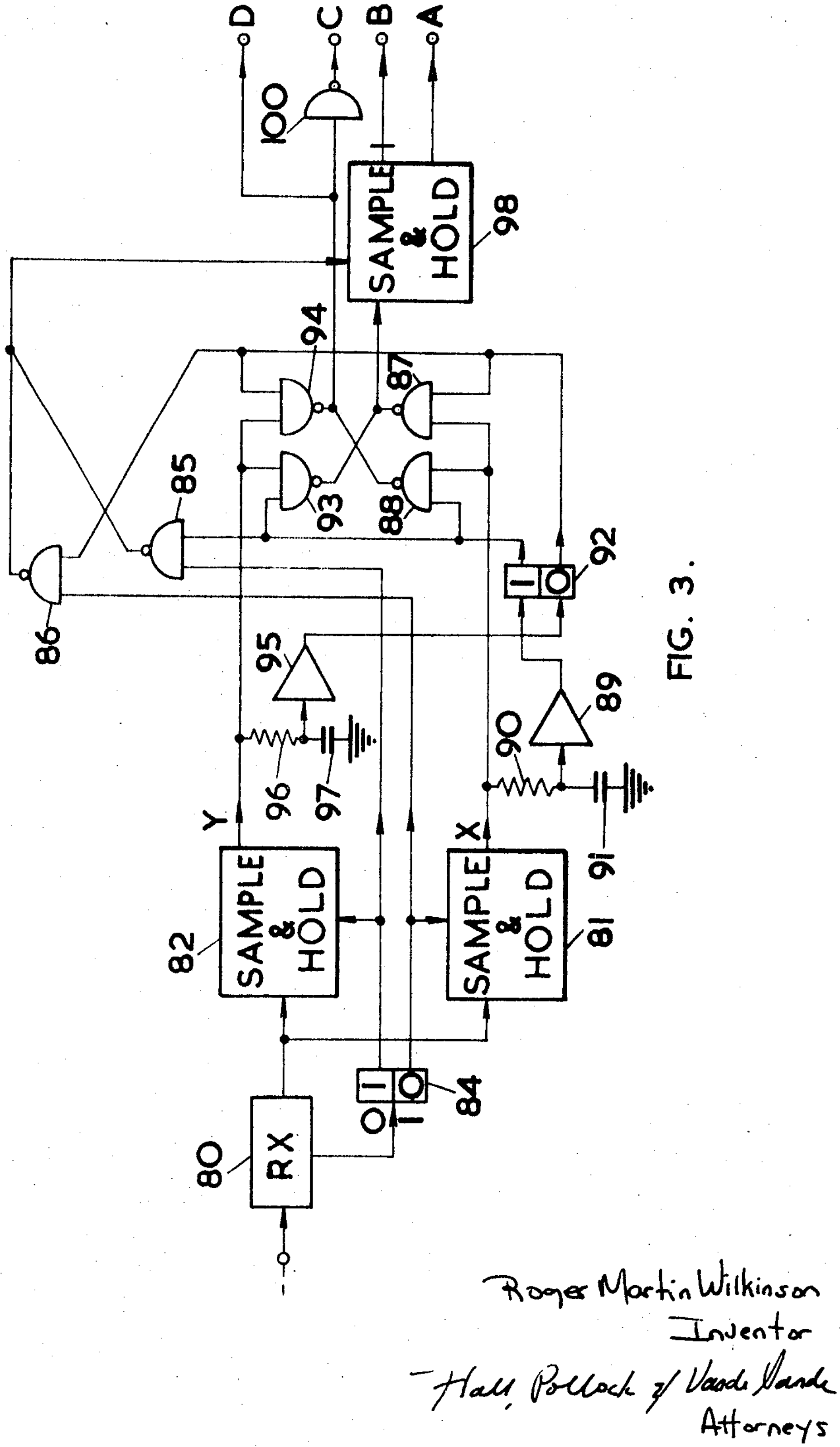
FIG. 3 is a block circuit diagram of an alternative form of part of the receiving apparatus of FIG. 2.

FIG. 3 shows a receiver 80 constructed to receive the signals transmitted by the transmitter 15 of FIG. 1. The receiver 80 has a signal output which is connected to the signal inputs of two sample-and-hold circuits 81 and 82. A second output of the receiver 80 is connected to a switching input of a bistable circuit 84. The bistable circuit 84 has two complementary outputs of which the one-state output is connected to the strobing input of the sample-and-hold circuit 82, and to one input of a NAND-gate 85. The zero-state output of the bistable circuit 84 is connected to the strobing input of the sample-and-hold circuit 81 and to one input of a NAND-gate 86. An output X from the output of the sample-and-hold circuit 81 is connected to one input of each of two NAND-gates 87 and 88 and to the input of threshold amplifier 89 via an integrating circuit. The integrating circuit is comprised of a resistor 90 and a capacitor 91. The output of the amplifier 89 is connected to the one-state setting input of a bistable circuit 92. An output Y from the sample-and-hold circuit 82 is connected to one input of each of two NAND-gates 93 and 94 and to the input of a threshold amplifier 95 via another integrating circuit. This integrating circuit is comprised of a resistor 96 and a capacitor 97. The output of the amplifier 95 is connected to the zero-state setting input of the bistable circuit 92. The bistable circuit 92 has two complementary outputs of which the one-state output is connected to a second input of each of the NAND-gates 85, 88 and 93. The zero-state output of the bistable circuit 92 is connected to a second input of each of the NAND-gates 86, 87 and 94. The outputs of the NAND-gates 85 and 86 are connected together and connected to the strobing input of a sample-and-hold circuit 98. The outputs of the NAND-gates 87 and 93 are connected together and connected to the signal input of the sample-and-hold circuit 98. The sample-and-hold circuit 98 has complementary outputs of which the one-state output is connected to a signal output channel A while the zero-state output is connected to the signal output channel B. The outputs of the NAND-gates 88 and 94 are connected together and connected directly to a signal output channel D and are connected via a NAND-gate 100 to a signal output channel C.

The mode of operation of the circuit of FIG. 3 will now be described. The function this circuit performs is to direct the polarity signal bits into the polarity channel and the amplitude bits into the amplitude channel. It therefore corresponds to items 30 to 36 inclusive and 41 to 47 inclusive in the circuit of FIG. 2.

The signal outputs A, B, C and D of the circuit of FIG. 3 are equivalent to the corresponding outputs A, B, C and D of the sample and hold circuits 33 and 36 of FIG. 2.

The signal output of the receiver 80 is a reconstituted version of the signal applied to the modulation input of the transmitter 15 of FIG. 1.

As described hereinbefore the polarity and magnitude bit signals are transmitted alternately, the polarity bit for any one sample being transmitted first. The reconstituted bit signals appear at the signal output of the receiver 80 in the same order and are applied to the inputs of the sample-and-hold circuits 81 and 82. The bistable circuit 84 is switched at the bit transmission rate of the received signals, by a synchronizing signal derived by a conventional synchronization detector within the receiver 80; the outputs of the bistable circuit 84 therefore provide strobing pulses whose negative-going edges occur at half the bit transmission rate. The sample-and-hold circuits 81 and 82 are strobed by the complementary outputs of the bistable 84; they respond to their signal inputs only when the negative-going edges of the strobing pulses are applied to their strobing inputs, and hold each output signal until the next arrival of a negative-going strobing pulse edge. Hence the bit signals applied to the signal inputs of the bistable circuits 81, 82 are set up on their corresponding outputs during alternate bit-periods of the received signals. These actions of the sample-and-hold circuits 81 and 82 coincide with the periods of the polarity bits and the amplitude bits respectively, but not necessarily in the correct order. The polarity bits for example may be directed to either of the outputs designated X or Y. However because of the nature of speech signals the output carrying the polarity bits will tend to comprise alternate ones and zeros, whereas the other output, carrying the amplitude bits, will from time to time carry sequences of zero-level signals corresponding to low-level speech.

The time constant of the integrator circuits 90, 91 and 96, 97 is chosen so that a succession of one-level signals or a succession of alternate one-level and zero-level signals applied to their inputs will produce at their outputs a smoothed mean voltage greater than the threshold level of the respective threshold amplifiers 89 and 95. The time constant of the integrator circuits is long enough to ensure that a short interruption in the received signals may not significantly alter the voltages developed at their outputs. In fact if the signal levels on either of the integrator inputs should be at the one-level for at least a predetermined minimum proportion of a stream of bit-signals then the output of the associated threshold amplifier will switch to the one-level. Hence the polarity-bit signals will tend to produce a one-level at the output of the threshold amplifier connected to the channel which receives them, while the amplitude-bit signals will tend to produce a zero-level at the output of the threshold amplifier connected to the channel receiving them.

The bistable circuit 92 is constructed to respond immediately, but only to zero-level signals, so that when a zero-level signal is applied to either of its inputs the corresponding output is set to a one-level. A zero-level signal from either of the threshold circuits 89 or 95 can cause the bistable circuit 92 to change its state. Hence the state of the bistable circuit 92 indicates which of either the X or Y outputs has, or most recently had, a predominance of zero-level signals of the kind formed by the amplitude-bit signals during periods of low-level speech. In this respect the operation of the present embodiment differs from the embodiment of FIG. 2 wherein the alternating nature of the polarity bits was used to provide an indication of correct or incorrect channel allocation.

Hence if the polarity bits appear on the X output and the amplitude bits on the Y output, then the zero-state output of the bistable 92 will produce a one-level signal. Under these conditions the NAND-gate 87 will receive polarity-bit signals, tending to comprise alternate one-level and zero-level signals, on one of its inputs, and a permanent one-level on the other input. The output of the NAND-gate 87 will therefore develop an inverted version of the received polarity-bit signals. Because one of the inputs of the NAND-gate 93 is held at zero-level by the bistable circuit 92 it cannot develop a zero-level output.

The NAND-gates used in the present embodiment are such that where the outputs of two or more of them are connected together, a zero-level signal developed at their common output connection by any one of the NAND-gates will overrule any tendency for the other gates to develop a one-level signal thereon. The signals produced by the NAND-gate 87 will therefore control the voltage signals applied to the sample-and-hold circuit 98, since its zero-level output will overrule any tendency for the gate 93 to provide one-level output signals on the common connection. Now consider the NAND-gate 94. One of its inputs receives the amplitude-bit signals from the Y output. Since the other input of the NAND-gate 94 is held at the one-level, its output will be the inverse of the amplitude-bit signals. The NAND-gate 100 applies a further inversion, thereby reproducing the amplitude-bit signals on the output C. The NAND-gate 88 cannot produce zero-level signals because one of its inputs is held at the zero-level, and therefore it will not interfere with the amplitude-bit signals. The polarity signal bits therefore appear at the signal input of the sample-and-hold circuit 98 while the amplitude bits appear as complementary signals at the outputs C and D. When the signal to be transmitted increases in magnitude so that the amplitude-bit signal on the Y output changes to the one-level no change in allocation will occur, because although the output of the threshold amplifier 95 will switch from the zero-level to the one-level the bistable circuit 92 will not respond to one-level signals. Although one of the inputs to the NAND-gate 93 will have changed to the one-level, the other input is still at the zero-level and therefore no change will occur at its output. Consequently the inverted polarity bits still appear at the output of the NAND-gate 87; however both of the inputs to the NAND-gate 94 will be at the one-level and the output at C will change to the one-level.

Now consider that for some reason the allocation of signals at the X and Y outputs is reversed. If the amplitude bits are "ones" when reallocation occurs the threshold amplifier outputs will give no indication because both their average input levels will still be above the threshold level. Their respective output levels remain unchanged and consequently the state of the bistable circuit 92 will remain unchanged, and the signals will be incorrectly allocated. However on the first occasion that the amplitude bits on the X output change to the zero-level for a minimum predetermined period the output of the threshold amplifier 89 will switch to the zero-level state. The bistable circuit 92 will therefore be reset, and its output which is connected to the NAND-gates 85, 88 and 93 will be set to the one-level. The output of the NAND-gate 93 will now reproduce the polarity-bit signals in inverted form. The output of the NAND-gate 87 is held at the zero-level by the output of the NAND-gate 93. The output of the NAND-gate 88 reproduces the amplitude-bit signals in inverted form, while the NAND-gate 94 does not affect the process because one of its inputs is held at the zero-level.

Thus no matter which of the outputs X or Y initially receives the polarity-bit signals they will eventually be directed through their respective NAND-gates to the circuit 98 while the amplitude-bit signals are reproduced on the output C.

The polarity bit signals are applied (in inverted form) to the signal input of the sample-and-hold circuit 98 and they are transferred to its output A each time a negative-going transition occurs at the common output of the NAND-gates 85 and 86. The output signals are then held awaiting the next strobing signal, which can only occur when the output of the bistable circuit 84 has completed another complete cycle. Thus each polarity bit signal is held at the output of the sample-and-hold circuit 98 until the following amplitude bit signal arrives at C, D. One or the other of the NAND-gates 85 or 86 will always have one of its inputs held at the zero-level and therefore cannot influence the output. The other of the two NAND-gates 85 or 86 will have an input at the one-level and consequently its output will switch from the one-level state to zero-level each time a one-level signal is supplied by the appropriate output of the bistable circuit 84. This will only occur once every cycle of the output of the bistable circuit 84 simultaneously with the strobing of one of the bistable circuits 81 or 82. It follows that the polarity-bit signals are applied to the output A in synchronism with the application of the amplitude-bit signals to the output C. Inversions of the polarity-bit signals and the amplitude-bit signals are also simultaneously developed at the complementary outputs B and D.

Figure 4:
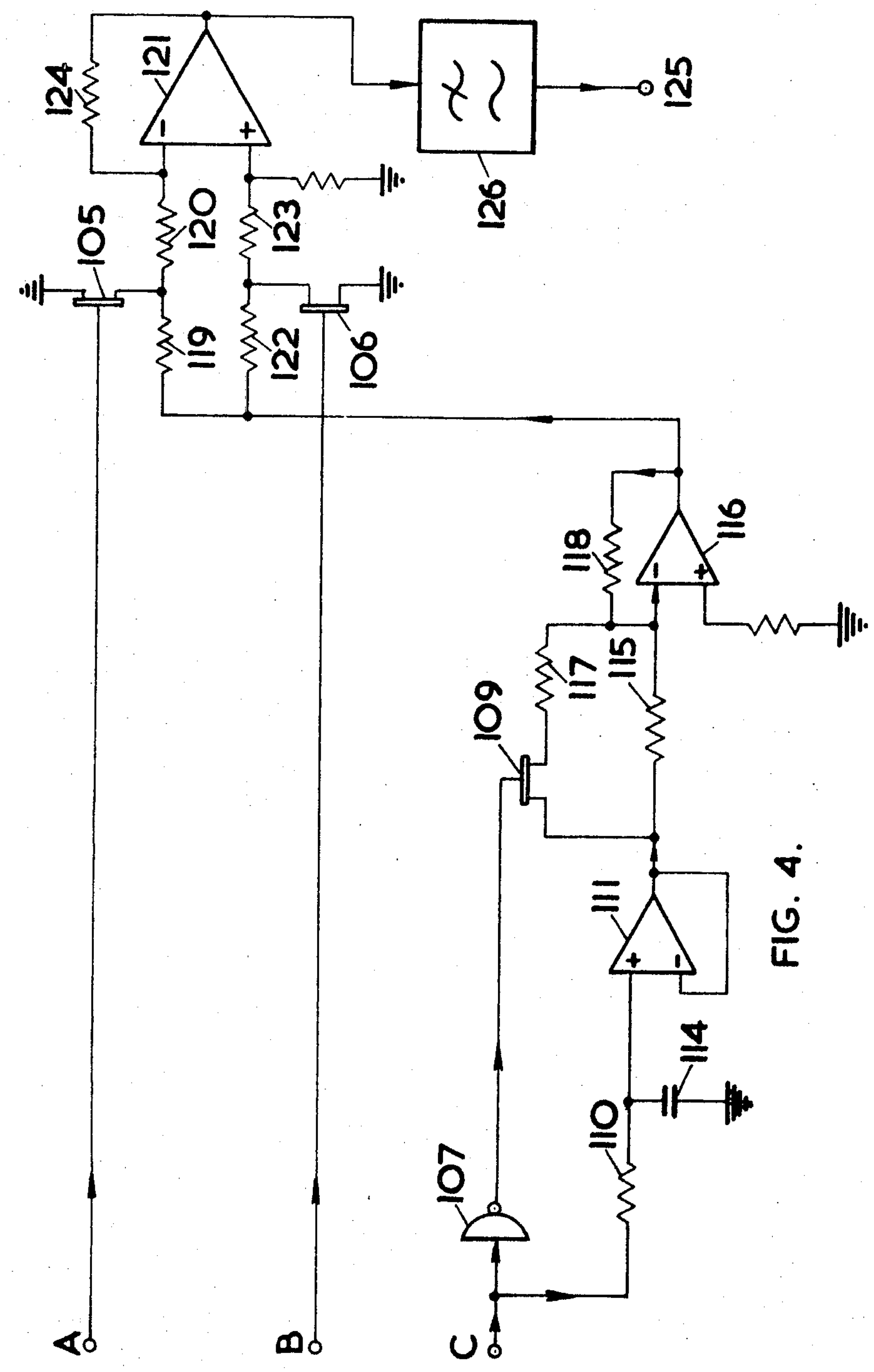
FIG. 4 is a block circuit diagram of an alternative form for the decoder part of the apparatus of FIG. 2.

An alternative form for the decoder part of the apparatus of FIG. 2 is shown in FIG. 4. It has an input A connected to the gate electrode of a field effect transistor 105, an input B connected to the gate electrode of a field effect transistor 106, and an input C connected via a NAND-gate 107 to the gate electrode of a field effect transistor 109. The input C is also connected to an integrating circuit comprising a resistor 110 and a capacitor 114. The output of the integrating circuit is connected through a unity gain amplifier 111 to the source electrode of the transistor 109. The output of the amplifier 111 is also connected by a resistor 115 to the negative input of a differential input operational amplifier 116. The drain electrode of the transistor 109 is connected to the negative input of the amplifier 116 by a resistor 117. The amplifier 116 has a feedback resistor 118. The output of the amplifier 116 is connected by two resistors 119 and 120 in series to the negative input of a differential input operational amplifier 121, and by two other resistors 122 and 123 in series to the positive input of the amplifier 121. The amplifier 121 has a feedback resistor 124. The transistors 105 and 106 are connected between ground and the junctions of the resistors 119 and 120 and the resistors 122 and 123 respectively. The output of the amplifier 121 is connected to an audio output terminal 125 by a low-pass filter 126.

The mode of operation of the decoder of FIG. 4 will now be described. The inputs A, B and C may be connected to the outputs A, B and C of the de-multiplexer circuit of FIG. 3, so that A will receive the polarity-bit signals and B will receive their complements while C will receive the amplitude bit. A one-level signal on the input A or B (one-level corresponds to a positive voltage in the present embodiment) will cause the corresponding transistor 105 or 106 to be non-conductive. A zero-level input signal (approximately 0 voltage) will cause the transistor 105 or 106 to be conductive and in effect will short circuit the junction of the series resistors 119 and 120 or 122 and 123 respectively to ground. As the signal levels on A and B are always complementary, one of the transistors 105 or 106 will always be conductive while the other will be non-conductive. The amplitude-bit signal appearing on the line C will produce either a zero-level or a one-level respectively at the output of the NAND-gate 107 thus rendering the transistor 109 conductive or non-conductive accordingly. When the transistor is conductive the input resistance to the negative input of the operational amplifier 116 will consist of resistors 117 and 115 in parallel. When the transistor 109 is non-conductive the input resistance to the operational amplifier 116 is resistance 115 only. As the gain of an operational amplifier is determined by the ratio of its input and feedback resistances then the amplifier 116 will have a high value of gain when a one-level signal appears set on the input C and conversely will have a relatively low value of gain when a zero-level signal appears on the input C. The one and zero levels appearing on the input C are also applied to the simple integrating circuit formed by the resistance 110 and capacitor 114, which are the same or similar to the resistor 16 and capacitor 17 of FIG. 1. The output voltage of this integrating circuit tends to follow the variations of the speech signal level and is a substantial reproduction of the reference voltage existing on the line 6 of FIG. 1. This output voltage forms the input signal to the amplifier 116 after passing through the unity gain amplifier 111. The purpose of the unity gain amplifier is to provide a low source impedance and also isolate the integrating circuit from the input of the amplifier 116. The output signal of the amplifier 116 is applied to either the positive input or the negative input of the amplifier 121 depending on whether the polarity-bit signal is a one or a zero. The polarity of the output of the amplifier 121 will therefore follow the reversals of the polarity-bit signal, corresponding to the cyclic variations of the original speech signal components. The output voltage of the amplifier 121 will also vary in amplitude according to the effective gain of the amplifier 116 which is controlled by the amplitude-bit signals, the amplitude being large for a one-level amplitude-bit signal and relatively low for a zero-level amplitude-bit signal. The low-pass filter 126 eliminates some of the higher frequency noise components in the reconstituted audio signal. The de-coder of FIG. 4 could also be used with the embodiment of FIG. 2, in which case the inputs A, B and C of FIG. 4 would be connected respectively to the outputs A, B and C of the sample and hold circuits 33 and 36 of FIG. 2. The parts 37 to 40 inclusive and 48 to 64 inclusive of FIG. 2 would then be replaced by the embodiment of FIG. 4.

A modification of the telecommunications system will now be described with reference to FIGS. 5 and 6. In this modified system each sample of a speech signal is represented by three binary signals, of which one signal represents the polarity of the sample as in the system hereinbefore described while the other two signals in combination represent the amplitude of the sample.

Figure 5:
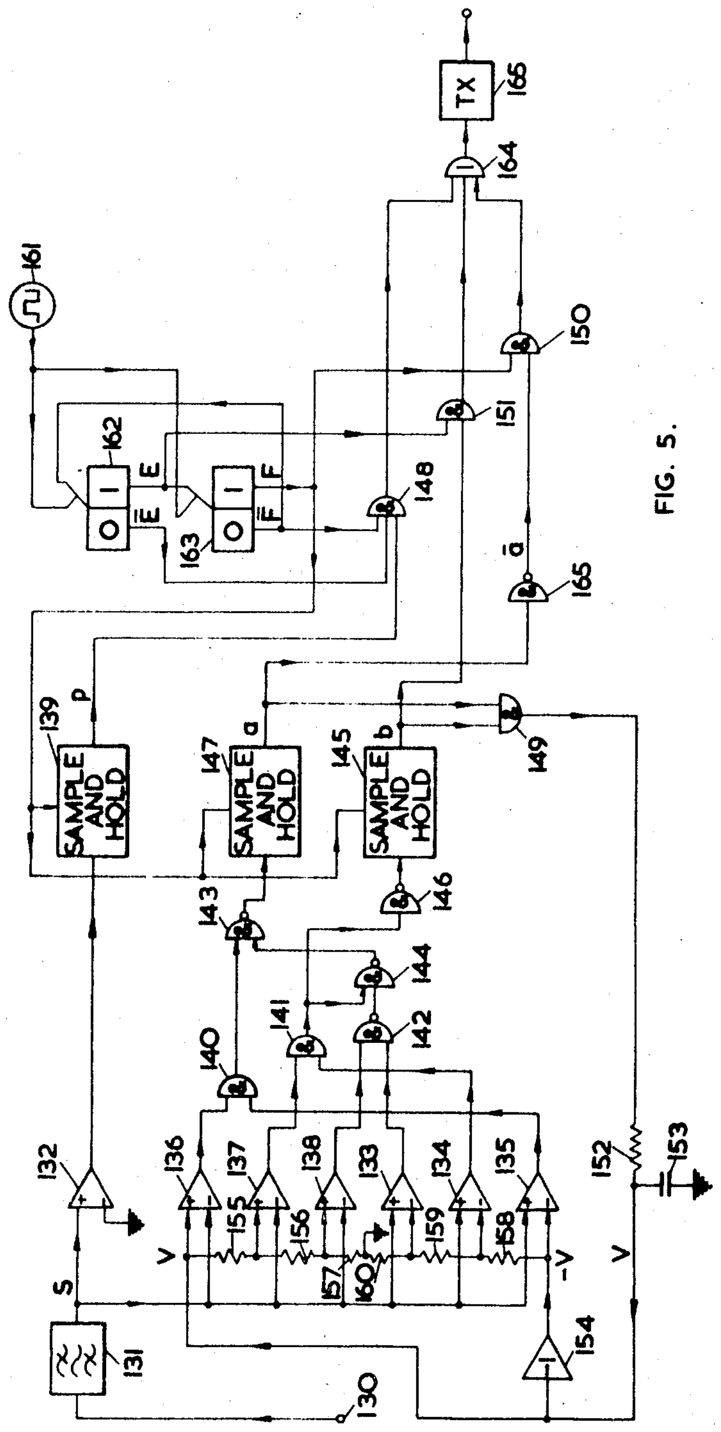
FIG. 5 is a block circuit diagram of transmitting apparatus in another pulse code modulation telephony system.

FIG. 5 shows a speech signal input 130 connected, via a band-pass filter 131, to the positive signal input terminals of four comparator amplifiers 132, 133, 134 and 135, and to the negative signal input of the comparator amplifiers 136, 137 and 138. The negative signal input of the amplifier 132 is connected to ground. The output of the amplifier 132 is connected to the signal input of a sample-and-hold circuit 139. The outputs of the amplifiers 135 and 136 respectively are connected to separate inputs of an AND-gate 140. The outputs of the amplifiers 134 and 137 respectively are connected to separate inputs of an AND-gate 141. The outputs of the amplifiers 133 and 138 respectively are connected to separate inputs of NAND-gate 142. The output of the AND-gate 140 is connected to one input of a NAND-gate 143. The output of the AND-gate 141 and of the NAND-gate 142 are connected to separate inputs of a NAND-gate 144. The output of the AND-gate 141 is also connected to the signal input of a sample-and-hold circuit 145 via a NAND-gate 146. The output of the NAND-gate 144 is connected to a second input of the NAND-gate 143. The output of the NAND-gate 143 is connected to the signal input of a sample-and-hold circuit 147. The sample-and-hold circuits 139, 145 and 147 have outputs *p*, *b* and *a* respectively. The output *p* of the sample-and-hold circuit 139 is connected to one input of an AND-gate 148. The output *a* of the sample-and-hold circuit 147 is connected to an AND-gate 149 and a NAND-gate 165. The output *b* is also connected to an input of an AND-gate 151 and another input of the AND-gate 149. The output of the NAND-gate 165 is connected to an input of an AND-gate 150. The output of the AND-gate 149 is connected to a simple integrating network comprising a resistor 152 and a capacitor 153. The output of the integrating network is connected to the input of an inverting amplifier 154 and to the positive input of the amplifier 136. It is also connected via an attenuating network to the positive signal inputs of the amplifiers 137 and 138. The attenuating network is comprised of resistances 155, 156 and 157 connected in series. The output of the inverting amplifier 154 is connected to the negative input of the amplifier 135 and via a second attenuating network to the negative inputs of the amplifier 134 and 133. The second attenuating network comprises resistances 158, 159 and 160 in series.

A source of clock pulses 161 is connected to the switching inputs of two bistable circuits 162 and 163. An output E, the one-state output, of the bistable circuit 162 is connected to the one-state setting input of the bistable circuit 163 and to a second input of the AND-gate 151. An output F, the one-state output, of the bistable circuit 163 is connected to the strobing inputs of the sample-and-hold circuits 139, 145 and 147. The output F is also connected to a second input of the AND-gate 150. An output $\overline{F}$, the zero-state output of the bistable circuit 163, is connected to the one-state setting input of the bistable circuit 162 and to a second input of the AND-gate 148. An output $\overline{E}$, the zero-state output of the bistable circuit 162, is connected to a third input of the AND-gate 148. The outputs of the AND-gates 148 and 151 are connected to two separate inputs of an OR-gate 164. The output of the AND-gate 150 is connected to a third input of the OR-gate 164. The output of the OR-gate 164 is connected to a modulation input of a transmitter 166.

In the circuit of FIG. 5 the amplifiers 133 to 138 inclusive are similar to the amplifiers 4 and 5 of FIG. 1. Likewise the amplifiers 132 and 154 of FIG. 5 are similar to the amplifiers 3 and 7 respectively of FIG. 1. The bistable circuits 162 and 163 are of the conventional type known as J-K flip-flops and they are interconnected in a known manner so that the frequency of the outputs of the bistable circuit 163 is one third of the input clock frequency. The clock frequency and the bit transmission rate in this embodiment are 19.2 KHz. and 19.2 K bits per second respectively. Since three bits are transmitted for each sample the system has a sampling rate of 6,400 samples per second. For each sample of the speech signal, a polarity bit signal *p* is transmitted first, followed by an amplitude bit signal *b* and then an amplitude bit signal *a*. The complement $\bar{a}$ of the amplitude bit signal *a* is actually transmitted rather than the normal signal *a*, for reasons which will be explained later.

The comparator reference voltage V from the output of the integrating circuit is applied directly to the positive input of the comparator amplifier 136. Fractions of the voltage V are applied to the positive inputs of the comparator amplifiers 137 and 138, these fractions being derived from the attenuating chain of resistors 155, 156 and 157. In this embodiment the fractions applied to the amplifiers 137 and 138 are ⅔ V and ⅓ V respectively. An inverted version of the reference voltage V is applied to the negative input of the comparator amplifier 135 while fractions of the inverted reference voltage–V are applied to the negative inputs of the comparator amplifiers 133 and 134. These fractions are derived from the attenuating chain of resistors 158, 159 and 160. The fraction applied to the comparator amplifier 134 is –⅔ V while that applied to the comparator amplifier 133 is –⅓ V. The comparator amplifiers 136, 137 and 138 are adjusted to provide one-level outputs when the instantaneous speech signal input voltage applied to their negative inputs is less positive than the instantaneous level of their respective reference voltage inputs. Similarly the comparator amplifiers 133, 134 and 135 are adjusted to provide one-level outputs when the instantaneous speech signal input voltage applied to their positive inputs is less negative than the instantaneous level of their respective reference voltages. In other words, when the voltage at an amplifier positive input terminal is more positive than the voltage at its negative input terminal, its output will be at the one-level.

The operation of the comparator amplifier 132 together with its associated sample-and-hold circuit 139 is similar to that of the corresponding parts of the embodiment of FIG. 1 (4 and 10 respectively) and therefore need not be set out in full.

The output states of the amplitude comparator amplifiers 133 to 138 are sampled by the sample-and-hold circuits 145 and 147. The sample-and-hold circuits 139, 145 and 147 are strobed simultaneously and their output states are held for three bit periods pending the arrival of the next strobing pulse.

The strobing pulses are derived from the output F of the bistable circuit 163, and occur with a repetition rate equal to one third of the clock frequency.

Table 1 shows the logical output states *p*, *a* and *b* of the sample-and-hold circuits 139, 147 and 145 respectively for different ranges of the instantaneous speech signal voltages.

TABLE 1

| CASE | Speech input voltage | *p* | *a* | *b* |
|---|---|---|---|---|
| (i) | S > V | 1 | 1 | 1 |
| (ii) | V > S > ⅔V | 1 | 0 | 1 |
| (iii) | ⅔V > S > ⅓V | 1 | 1 | 0 |
| (iv) | ⅓V > S > OV | 1 | 0 | 0 |
| (V) | O > S > –⅓V | 0 | 0 | 0 |
| (vi) | –⅓V > S > –⅔V | 0 | 1 | 0 |
| (vii) | –⅔V > S > –V | 0 | 0 | 1 |
| (viii) | –V > S | 0 | 1 | 1 |

Eight different conditions of input speech voltage S are shown in Table 1 together with their logical state representations which exist at the outputs of the corresponding sample-and-hold circuits. The method of operation of the logic gate circuits 140 to 144 inclusive and 146 which produce the *a* and *b* output states will now be described with reference to some of the cases shown in Table 1.

The conditions of case (iv) for example arise when the amplitude of the instantaneous speech voltage S is greater than 0 V (i.e., positive) but less than ⅓ V. The outputs of all the comparator amplifiers 132 to 138 inclusive will be at the one-level. Therefore the outputs of the AND-gates 140 and 141 will be at the one-level; the output of the NAND-gate 142 will be at the zero-level, the output of the NAND-gate 144 will be at the one-level and the output of the NAND-gate 143 will be at the zero-level. Hence the signals applied to the signal inputs of the sample-and-hold circuits 145 and 147 will be zeros. The input to the sample-and-hold circuit 139 will of course be a one. These various levels are transferred to the corresponding sample-and-hold circuit outputs at the onset of the next strobing pulse.

Now consider case (iii). The only change which will occur when going from the conditions of case (iv) to those of case (iii) will be at the output of the amplifier 138. That output will now be at the zero-level. Hence the output of the NAND-gate 142 will be at the one-level giving rise to a zero-level at the output of the NAND-gate 144 which in turn gives rise to a one-level at the signal input of the sample-and-hold circuit 147. After the next strobing pulse therefore the *a* output will be set to the one-level.

One further situation will be described which will be that for the conditions of case (vi). The input S is now negative, but it is still more positive than –⅔ V, so that the outputs of the amplifiers 134 and 135 will still be at the one-level while that of the amplifier 133 will be at the zero-level. The outputs of the amplifiers 136, 137 and 138 will be at the one-level. Hence the outputs of the gates 140, 141 and 142 will be at the one-level, the output of the NAND-gate 144 will be at the zero-level and the output of the NAND-gate 143 will be at the one-level. The output of the comparator amplifier 132 will apply a zero-level to the signal input of the sample-and-hold circuit 139. After the onset of the next following strobing pulse therefore the outputs *p*, *a* and *b* will be at the zero, one and zero levels respectively.

Figure 7:
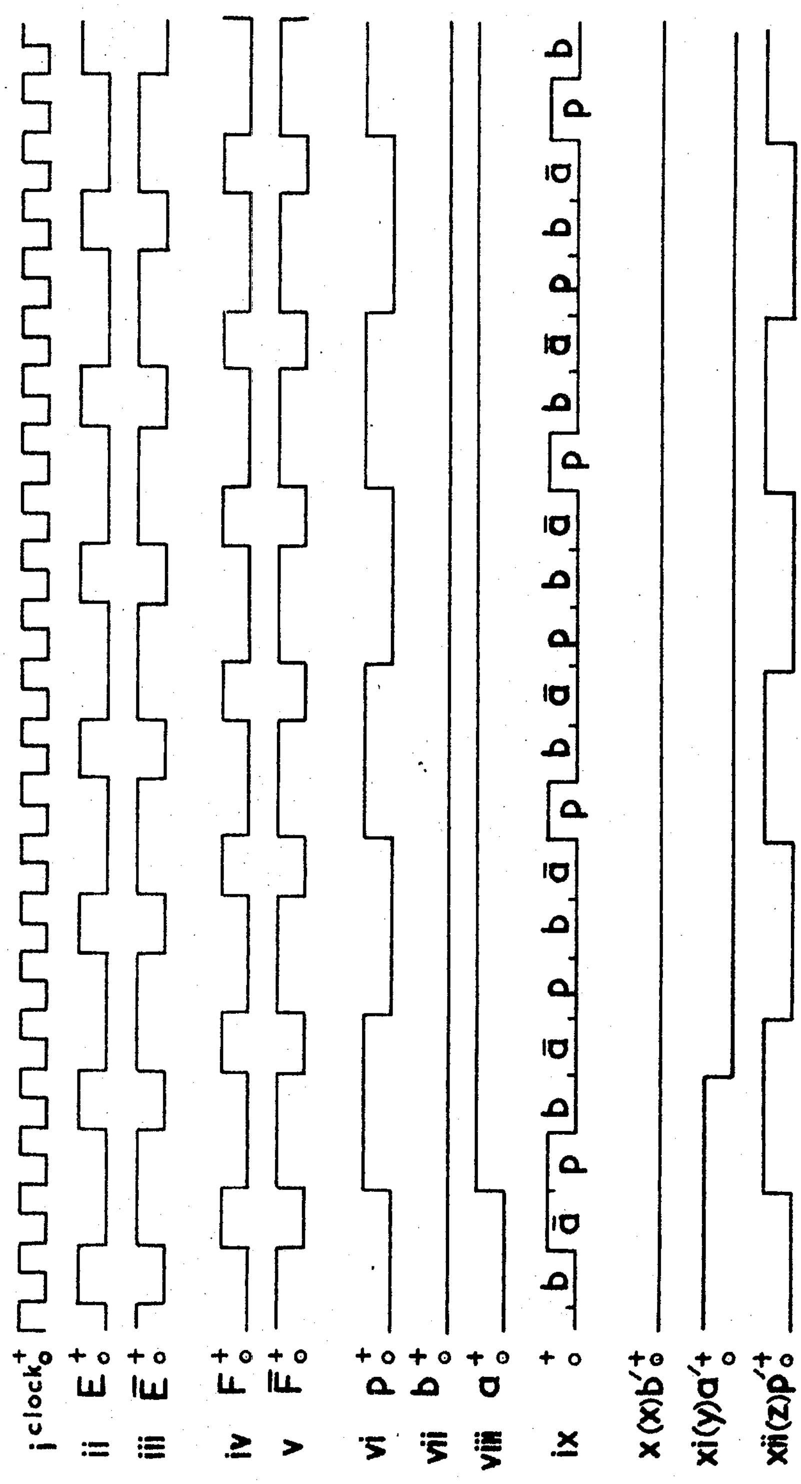
FIG. 7 is a diagram showing graphical representations of various voltages occuring in the apparatus of FIGS. 5 and 6.

The simultaneously sampled levels of the outputs *p*, *a* and *b* represent a sample of the speech signal. In the present embodiment they are transmitted sequentially, in the order *p*, *b*, *a*. This is achieved by a multiplexer formed by the AND-gates 148, 150 and 151 (when supplied with suitable pulses from the bistable circuits 162 and 163) and an OR-gate 164. The operation of the multiplexer will now be explained with reference to FIG. 7. FIG. 7 shows:

(i), a stream of clock pulses;

(ii) and (iii), the outputs E and $\bar{E}$ respectively of the bistable circuit 162;

(iv) and (v), the outputs F and $\bar{F}$ respectively of the bistable circuit 163;

(vi), (vii) and (viii), typical outputs *p*, *b* and *a* respectively of the sample-and-hold circuits 139, 145 and 147;

(ix), the output of the OR-gate 164;

(x), (xi) and (xii), show de-multiplexer levels occurring in the embodiment of FIG. 6 and will be referred to hereinafter.

The + marks in FIG. 7 indicate the one-level while zero indicates the zero-level.

The Graphs (vi), (vii) and (viii) represent by way of example a portion of a speech signal voltage which is of relatively low amplitude, its excursions initially being within the limits of ⅓ V and –⅓ V and then increasing to values within the limits ⅔ V and –⅔ V.

The combination of inputs to the AND-gate 148 required to allow a polarity one-level bit to be transmitted can only occur when the bistable outputs E and F are both at the one level. A *b* amplitude one-level bit can only be transmitted when the input E to the AND-gate 151 is at the one-level, and an $\bar{a}$ amplitude one-level bit can only be transmitted when the input F to the AND-gate 150 is at the one-level. These events occur in the cyclic order *p*, *b*, *a*. The Graph (ix) of FIG. 7 represents the polarity and amplitude bits as they are presented to the modulation input of the transmitter 166 for transmission. The inverse $\bar{a}$ of the amplitude-bit is transmitted instead of the normal form *a*. The required inversion is performed by the NAND-gate 165.

The output F of the bistable circuit 163 is also the strobing input to the sample-and-hold circuits 139, 145 and 147. Strobing occurs on negative-going transitions of this signal.

The integrating circuit comprising the resistor 152 and the capacitor 153 has a similar time constant to the corresponding circuit of FIG. 1. It is supplied with a one-level signal only when both *a* and *b* amplitude outputs are at the one-level.

The band-pass filter 131 is similar to the filter 2 of FIG. 1 but its pass band may be slightly wider, e.g., between 250 Hz and 3 KHz.

In operation the embodiment of FIG. 5 samples the instantaneous value of a speech signal at regular intervals and represents each sample by one polarity-bit signal and a combination of two amplitude-bit signals. These bit signals are then transmitted in sequence by the transmitter 166.

The reference voltage V is derived from the logical combination of the two amplitude-bits and because the input speech voltage S is compared with a wider range of reference levels than was the case with the embodiment of FIG. 1, this system is capable of providing a more accurate coded representation of the speech signal.

Figure 6:
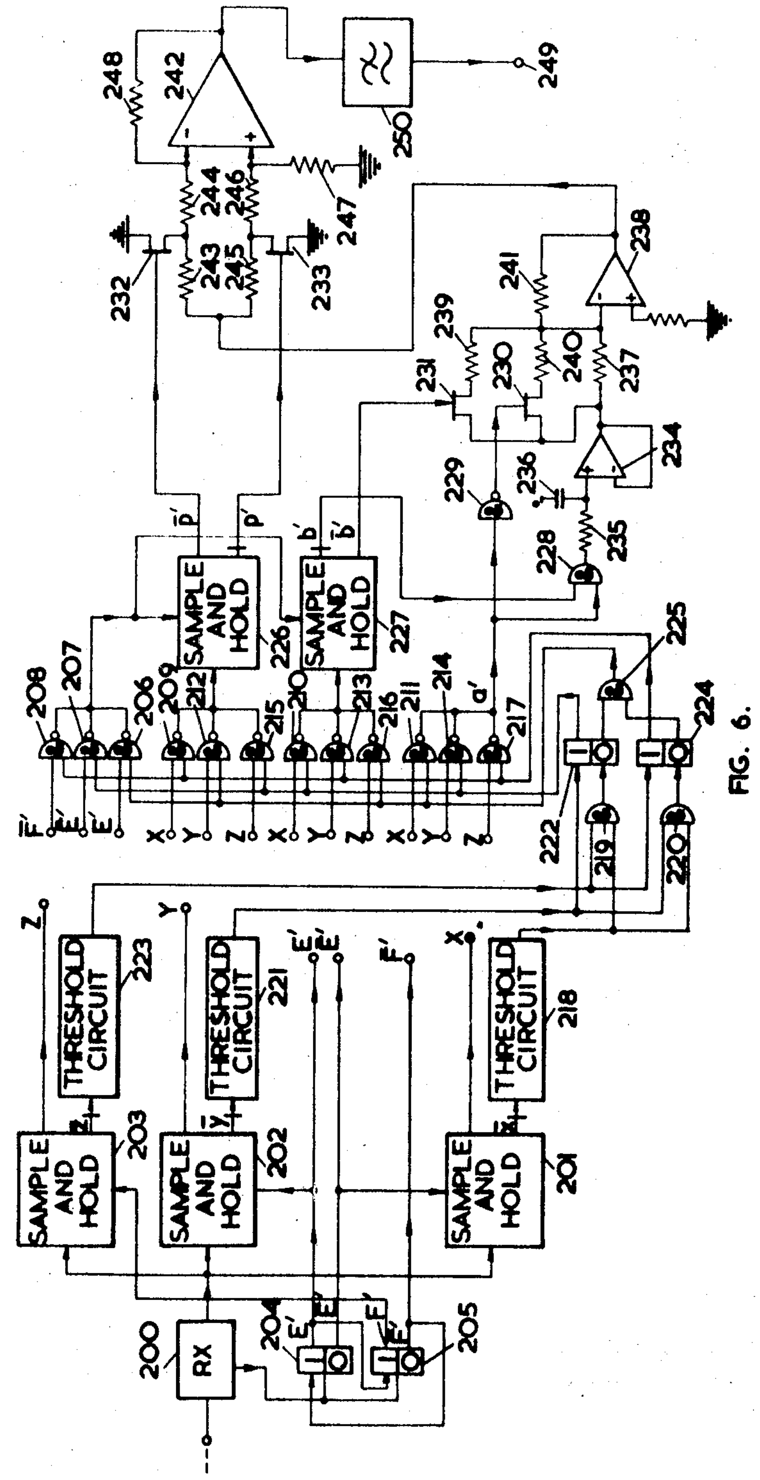
FIG. 6 is a block circuit diagram of receiving apparatus for use in conjunction with the transmitting apparatus of FIG. 5

FIG. 6 shows apparatus for receiving and decoding signals transmitted by the apparatus of FIG. 5.

In FIG. 6 a receiver 200 has a signal output which is connected to the signal inputs of three sample-and-hold circuits 201, 202 and 203. The receiver 200 has a second output which is connected to the switching inputs of two bistable circuits 204 and 205. The one-state output E′ of the bistable circuit 204 is connected to the one-state setting input of the bistable circuit 205, to the strobing input of the sample-and-hold circuit 202 and to one input of a NAND-gate 206. The zero-state output $\overline{E}'$ of the bistable circuit 204 is connected to the strobing input of the sample-and-hold circuit 201 and to one input of a NAND-gate 207. The one state output F′ of the bistable circuit 205 is connected to the strobing input of the sample-and-hold circuit 203. The zero-state output $\overline{F}'$ of the bistable circuit 205 is connected to the one-state setting input of the bistable circuit 204 and to one input of a NAND-gate 208. The sample-and-hold circuits 201, 202 and 203 have complementary outputs X and $\overline{X}$, Y and $\overline{Y}$, and Z and $\overline{Z}$ respectively. The X output is connected to one input of each of three NAND-gates 209, 210 and 211. The Y output is connected to one input of each of three NAND-gates 212, 213 and 214. The Z output is connected to one input of each of three NAND-gates 215, 216 and 217. In order to simplify the drawing the lines carrying the outputs E′, $\overline{E}'$, $\overline{F}'$, X, Y and Z are shown in part only. The output $\overline{X}$ is connected to the input of a threshold detector 218. The output of the threshold detector 218 is connected to one input of each of two AND-gates 219 and 220. The output $\overline{Y}$ is connected to the input of a threshold detector 221 whose output is connected to the one-state setting input of a bistable circuit 222 and to a second input of the AND-gate 220. The output $\overline{Z}$ is connected to the input of a threshold detector 223, whose output is connected to the one-state setting input of a bistable circuit 224 and to a second input of the AND-gate 219. The outputs of the AND-gates 219 and 220 are connected to the zero-state setting inputs of the bistable circuits 222 and 224 respectively. The one-state output of the bistable circuit 222 is connected to the second input of each of the NAND-gates 207, 215, 210 and 214. The one-state output of the bistable circuit 224 is connected to the second input of each of the NAND-gates 208, 209, 213 and 217. The zero-state outputs of both the bistable circuits 222 and 224 are connected to inputs of an AND-gate 225. The output of the AND-gate 225 is connected to the second input of each of the NAND-gates 206, 212, 216 and 211. The outputs of the NAND-gates 206, 207 and 208 are connected together and connected to the strobing inputs of two sample-and-hold circuits 226 and 227. The outputs of the NAND-gates 209, 212 and 215 are connected together and connected to the signal input of the sample-and-hold circuit 226. The outputs of the NAND-gates 210,213 and 216 are connected together and connected to the signal input of the sample-and-hold circuit 227. The outputs of the NAND-gates 211, 214 and 217 are connected together to form an output *a*′ which is connected to one input of an AND-gate 228 and also to the input of a NAND-gate 229. The output of the NAND-gate 229 is connected to the gate electrode of a field effect transistor 230. The sample-and-hold circuit 227 has complementary outputs of which the output *b*′ is connected to the second input of the AND-gate 228 and the output $\overline{b}'$ is connected to the gate electrode of a field effect transistor 231. The sample-and-hold circuit 226 has complementary outputs *p*′ and $\overline{p}'$ which are connected to the gate electrodes of two field effect transistors 232 and 233 respectively. The output of the AND-gate 228 is connected to the input of a unity gain amplifier 234 via a resistor 235. A capacitor 236 is connected between the input of the amplifier 234 and ground. The output of the amplifier 234 is connected to the source electrodes of the transistors 230 and 231 and is connected by a resistor 237 to the input of an operational summing amplifier 238. The drain electrodes of the transistors 231 and 230 are connected via resistors 239 and 240 respectively to the input of the amplifier 238. A feedback resistor 241 is connected between the input and the output of the amplifier 238. The output of the amplifier 238 is connected to the negative input of a differential operational amplifier 242 by two resistors 243 and 244 in series and to its positive input by two further resistors 245 and 246 in series. The junction of the resistors 243 and 244 is connected to the drain electrode of the transistor 232 whose source electrode is connected to ground. The junction of the resistors 245 and 246 is connected to the drain electrode of the transistor 233 the source electrode of which is also connected to earth. A feedback resistor 248 is connected between the output of the amplifier 242 and its negative input. The output of the amplifier 242 is connected to an audio frequency output terminal 249 via a low-pass filter 250. The positive input of the amplifier 242 is connected to ground via a resistor 247.

The embodiment of FIG. 6 is similar in parts to the embodiments of FIGS. 3 and 4. For example the receiver 200 performs a similar function to the receiver 80 of FIG. 3. The threshold circuits 218, 221 and 223 may be conveniently formed from an integrating network and an amplifier such as those shown in FIG. 3 (e.g., parts referenced 90, 91 and 89). The bistable circuits 222 and 224 are set and reset in a similar manner to the bistable circuit 92 of FIG. 3. Those parts of FIG. 6 which bear reference numerals 232, 233 and 242 to 247 inclusive operate in identical fashion to parts referenced 105, 106 and 119 to 124 inclusive of FIG. 4 and consequently their action need not be described in detail. The bistable circuits 204 and 205 operate similarly to the bistable circuits 162 and 163 of FIG. 5; that is to say the frequency of their outputs is one third that of the synchronising signal output from the receiver 200. The outputs E′, $\overline{E}'$, F′ and $\overline{F}'$ will have the same form and frequency as the outputs E, $\overline{E}$, F and $\overline{F}$ which are represented in FIG. 7, graphs (ii), (iii), (iv) and (v), but will not necessarily have the same phase. The sample-and-hold circuits 201, 202 and 203 are strobed in sequence by the one to zero level transitions of the outputs E′, $\overline{E}'$ and F′ respectively. These transitions are of course each synchronized with the beginning of a signal-bit period. Hence the polarity and amplitude bit signals appear at the outputs of the appropriate sample-and-hold circuits 201, 202 and 203 but their respective allocations to the output lines X, Y and Z are not predictable.

The method by which the reconstituted polarity and amplitude bit signals are correctly identified and allocated to the outputs *p*′, *b*′ and *a*′ will now be described. First it is necessary to detect which of the three outputs X, Y or Z carries the amplitude-bit signal *a*. The polarity-bit signals are readily detectable being generally alternate ones or zeros or alternate bunches of ones and zeros which give rise to a one-level at the output of the appropriate threshold detector. However in the case of the amplitude-bits both *a* and *b* are likely to be at the zero-level for considerable periods of time, and consequently trying to detect the presence of the $a$ signal bits would give rise to ambiguous indications. It is mainly for this reason that the inverted form of the bit signal $\bar{a}$ is transmitted. By arranging to detect the inverted form of the output of the sample-and-hold circuits 201, 202 and 203 the output carrying the $\bar{a}$ bit signal is readily identified. Suppose for example that the X output carries the polarity-bit signals, the Y output carries the $b$ amplitude-bits and the Z output carries the $\bar{a}$ amplitude-bits, clearly then the output $\bar{X}$ will still tend to comprise alternate one and zero levels, the output $\bar{Y}$ will tend to carry sequences predominantly of one-level signals while $\bar{Z}$ will tend to carry sequences predominantly of zero-level signals. The corresponding output levels of the threshold circuits 218, 221 and 223 will tend to be one, one and zero respectively, and it may reasonably be assumed that when one of the threshold circuits develops an output voltage near the zero-level it must be connected to the channel carrying the $\bar{a}$ amplitude-bit signals.

It should be remembered that the sequence of the received signals is in the order $p, b, \bar{a}$ and that the sample-and-hold circuits 201, 202 and 203 are strobed in a corresponding order. Hence the allocation of the bit signal states on the outputs X, Y and Z must be either (i) $p, b, \bar{a}$, or (ii) $b, \bar{a}, p$ or (iii) $\bar{a}, p, b$.

In the first of these cases, the threshold circuit 223 will develop a zero-level output, which will set the bistable circuit 224 so that its one-state output will be at the one-level. The threshold circuits 221 and 218 will meanwhile have one-level outputs. The output of the AND-gate 220 in this case will be at the one-level and cannot influence the bistable circuit 224. However the output of the AND-gate 219 will be at the zero-level and therefore the zero and one state outputs of the bistable circuit 222 will be set to the one-level and the zero-level respectively; it will not be affected by the one-level on its one-state setting input. The output of the AND-gate 225 will be at the zero-level under these conditions. The zero-level outputs from the AND-gate 225 and the one-state output of the bistable circuit 222 will now prevent the gates 206, 212, 216, 211, 207, 215, 210 and 214 from developing any zero-level outputs. However the one-state output from the bistable circuit 224 applies a one-level signal to each of the gates 208, 209, 213 and 217, thereby enabling them to transmit the signals from $\bar{F}$, X, Y, and Z respectively; since they are NAND-gates they will of course develop inversions of these signals on their outputs. Since the other gates are prevented from producing zero-level outputs, and with the gates used zero-level signals overrule one-level signals on the commoned output connections, they will not interfere with the signals transmitted. It follows that a signal equivalent to F′ (from the gate 208) will be applied as a strobing signal to the circuits 226 and 227, signals $\bar{p}$ (from gate 209) will be applied to the signal input of the circuit 226, signals $\bar{b}$ (from gate 213) will be applied to the signal input of the circuit 227, and signals $a$ (from gate 217) will be applied to the input of the gate 229.

In the second case, the threshold circuit 221 will develop a zero-level output, while the outputs of the circuits 223 and 218 will have one-level outputs. Compared with the first case, the conditions of the bistable circuits 222 and 224 will be reversed, with the result that a signal equivalent to E′ (from gate 207) will be applied to the strobing inputs of circuits 226 and 227, signals $\bar{p}$ (from gate 215) will be applied to the signal input of the circuit 226, signals $\bar{b}$ (from gate 210) will be applied to the signal input of the circuit 227, and signals $a$ (from gate 214) will be applied to the input of the gate 229.

In the third case, the threshold circuit 218 will develop a zero level output while the circuits 221 and 223 will have one-level outputs. This will cause both of the bistable circuits 222 and 224 to produce one-level signals from their zero-state outputs and zero-level signals from their one-state outputs. This prevents the gates 207, 215, 210, 214, 208, 209, 213 and 217 from interfering with the signal transmission. The resulting one-level signal output from the gate 225 enables the gates 206, 212, 216 and 211 to apply signals $\bar{E}'$, $\bar{p}$, $\bar{b}$, and $a$ respectively to the circuits 226, 227 and 229 respectively.

Hence in every case the signal input of the circuit 226 should receive the polarity-bit signals in inverted form; the signal input of the circuit 227 should receive the $b$ amplitude-bit signals in inverted form; and the $a$ amplitude-bit signals should be applied to the gate 229. In each case the signal used to select the $a$ amplitude bits is, in effect, used to control the sampling actions of the circuits 226 and 227.

Both the polarity and amplitude bit signals $p'$ and $b'$ must be delayed until the arrival of the $a'$ bit signal, in order to bring all three into correct time relationship. This is the purpose of the two sample-and-hold circuits 226 and 227.

The decoder part of the circuit operates in a similar way to the decoder circuit of FIG. 4. The AND-gate 228 develops a one-level output whenever signals $a = 1$, $b = 1$, representing a sample in the maximum amplitude range, are received. The outputs of the AND-gate 228 are applied to the integrating circuit 235, 236 to form a reference voltage which is fed through the buffer amplifier 234 to the operational amplifier 238. The $b$ and $a$ amplitude-bit signals are used to alter the effective gain of the amplifier 238 by making the transistors 230, 231 either conductive or non-conductive according to the magnitude of the sample represented. The output voltage of the amplifier 238 is therefore proportional to the magnitude of the sample represented and also proportional to the reference voltage. The polarity-bit signals control the application of the output of the amplifier 238 to the positive input or the negative output of the amplifier 242, so that it will form a reproduction of the original speech signal. The resistance 247 is chosen to ensure that the effective gain of the amplifier 242 will be the same for signals of both polarities. The low-pass filter 250 smoothes and removes quantising noise from the reproduction.

It will be realized that the embodiments described are by way of example only and many modifications thereof will be apparent to those skilled in the art. For example the amplitude of the sample of the analogue signal to be transmitted may be represented by a combination of three or more binary signals. Other forms of logic circuits, multiplexing circuits and decoders may be used. A variable gain amplifier may be used as a decoder in which case its input would be supplied with the polarity-bit signal and its gain control input supplied with a voltage derived from the amplitude-bit signals.

The sample-and-hold circuits may be conveniently formed from J-K flip-flop circuits which are well known.

I claim:

1. Telecommunications apparatus for transmitting analogue signals, comprising an analogue signal input, pulse-coding means connected to said analogue signal input, for generating a stream of digital word signals, wherein each digital word signal will represent a sampled instantaneous value of an analogue signal applied to said analogue signal input and will comprise one polarity-bit signal representing the sign of the difference between the sampled value and a predetermined value and at least one amplitude-bit signal representing the magnitude of the modulus of the said difference, and reference-level deriving means, connected to outputs of the said pulse-coding means, for deriving a variable reference-level signal dependent on the magnitudes of a plurality of the moduli represented in a sequence comprising a plurality of the said digital word signals which represent successively sampled values of the said analogue signal, the said pulse-coding means including means for generating the amplitude-bit signals, connected to receive the said reference-level signal from the said reference-level deriving means and controlled thereby, for generating the amplitude-bit signals to represent the magnitudes of the sampled values of the analogue signal quantized in terms of units whose size will vary according to the value of the said reference-level signal.

2. Telecommunications apparatus as claimed in claim 1, wherein the said pulse-coding means comprises means for generating a polarity-bit signal of a predetermined binary kind in response to each sampled instantaneous value of the said analogue signal which is found to be greater than the said predetermined value, and for generating a polarity-bit signal of the converse binary kind in response to each sampled instantaneous value of the said analogue signal which is found to be less than the said predetermined value, and wherein the said means for generating the amplitude-bit signals comprises means for generating a single amplitude-bit signal of a predetermined binary kind in response to each sampled instantaneous value of the said analogue signal whose difference from the said predetermined value is found to have a modulus greater than a magnitude determined by an instantaneous value of the said reference-level signal, and means for generating a single amplitude-bit signal of the converse binary kind in response to each sampled instantaneous value of the said analogue signal whose difference from the said predetermined value is found to have a modulus less than the said magnitude determined by the value of the said reference-level signal.

3. Telecommunications apparatus as claimed in claim 2 wherein the said pulse-coding means comprises an inverter connected to the output of the reference-level deriving means, and first, second and third comparator amplifiers, wherein each of the said comparator amplifiers has a signal input and a reference input, and wherein the signal inputs of the said comparator amplifiers are all connected to the said analogue signal input, the reference input of the first comparator amplifier being connected to receive a predetermined fixed voltage, the reference input of the second comparator amplifier being connected to receive the reference-level signal directly from the reference-level deriving means, and the reference input of the third comparator amplifier being connected to receive an inverted form of the reference-level signal from the said inverter.

4. Telecommunications apparatus as claimed in claim 3 and also comprising an OR-gate circuit connected to pass signals from the said second and third comparator amplifiers, and transmitting means for transmitting signals from the said OR-gate circuit and signals from the said first comparator amplifier through a telecommunications channel.

5. Telecommunications apparatus as claimed in claim 4 and wherein the said transmitting means comprises a first sample-and-hold circuit connected to the output of the said first comparator amplifier and a second sample-and-hold circuit connected to the output of the said OR-gate, and means for transmitting signals from the first and second sample-and-hold circuits sequentially.

6. Telecommunications apparatus as claimed in claim 1 wherein the said reference-level deriving means comprises an integrating circuit having a input connected to receive from the pulse-coding means at least some of the amplitude-bit signals generated to represent a sequence of successive sampled values of the analogue signal, and an output from which the said reference-level signal is derived.

7. Telecommunications apparatus as claimed in claim 6, wherein the said integrating circuit has a time constant of about 10 milliseconds.

8. Telecommunications apparatus, for receiving a continuous stream of pulse code signals formed of word signals wherein each word signal comprises one polarity-bit signal and at least one amplitude-bit signal sequentially transmitted, and represents one sampled instantaneous value of an analogue signal; the said apparatus comprising receiver means for receiving pulse code signals from a telecommunications channel;

switching means, having a signal input connected to receive said pulse code signals from the said receiver means, and having a control input and at least two outputs, for distributing successive ones of said pulse code signals sequentially to the said at least two outputs of said switching means in a predetermined cyclic order, and causing a single modification to the distribution whenever a signal is applied to the said control input;

threshold detector means, having an input connected to one of the said outputs of the said switching means, and having an output connected to the said control input of the said switching means, for applying a signal to the said control input whenever an average of a sequence of signals successively developed on the said one of the said outputs of said switching means occurs outside a predetermined range of values; and decoder means, having a polarity-bit signal input and at least one amplitude-bit signal input connected to separate outputs of the said switching means, for reproducing the said analogue signal by generating a sequence of signals having their polarities determined by the signals applied to its polarity-bit signal input and their amplitudes individually dependent on the bit signals applied to the said at least one amplitude-bit signal input and also proportional to an average of the values of a sequence of the signals applied to at least one amplitude-bit signal input of the said decoder means.

9. Telecommunications apparatus as claimed in claim 8 and wherein the said decoder means comprises reference-signal deriving means connected to the said at least one amplitude-bit signal input for deriving a reference signal dependent on an average of the values of a sequence of the signals applied to the said at least one amplitude-bit signal input, potential divider means connected across the output of the said reference-signal deriving means and having output connections on which predetermined fractions of the said reference signal will be developed, and further switching means, having a common output, separate analogue signal inputs connected to separate output connections of the said potential divider means, and control inputs separately connected to the said polarity-bit signal input and the said at least one amplitude-bit signal input, for connecting a predetermined one of the said analogue signal inputs to the said common output in response to each particular combination of binary signals which may be applied to the said control inputs.

10. Telecommunications apparatus as claimed in claim 9 wherein the said reference-signal deriving means comprises a resistance-capacitance integrating circuit.

11. Telecommunications apparatus as claimed in claim 13, wherein the said integrating circuit has a time constant of about 10 milliseconds.

12. Telecommunications apparatus as claimed in claim 8 and wherein the said decoder means comprises reference-signal deriving means connected to the said at least one amplitude-bit signal input for deriving a reference signal dependent on an average of the values of a sequence of the signals applied to the said at least one amplitude-bit signal input; an amplifier having an input connected to the reference-signal deriving means; gain-switching means having at least one control input connected to the said at least one amplitude-bit signal input and connected to control the said amplifier, for switching the effective gain of the said amplifier according to the pulse code signals applied to the said at lease one amplitude-bit signal input; and polarity-switching means, connected to the output of the said amplifier and having a control input connected to the said polarity-bit signal input, for passing the output of the said amplifier without inversion when a binary signal of one predetermined kind is applied to its control input and for inverting the said output of the said amplifier when a binary signal of the converse kind is applied to its control input.

13. Telecommunications apparatus as claimed in claim 12 and wherein the said reference-signal deriving means comprises a resistance-capacitance integrating circuit.

14. Telecommunications apparatus as claimed in claim 13 wherein the said integrating circuit has a time constant of about 10 milliseconds.

15. Telecommunications apparatus, for receiving a continuous stream of pulse code signals formed of word signals wherein each word signal comprises one polarity-bit signal and at least one amplitude-bit signal sequentially transmitted, and represents one sampled instantaneous value of an analogue signal; the said apparatus comprising receiver means for receiving pulse code signals from a telecommunications channel;

switching means, having a signal input connected to receive said pulse code signals from the said receiver means, and having at least two outputs, for distributing successive ones of said pulse code signals sequentially to the said at least two outputs in a predetermined cyclic order;

a plurality of threshold detector means, wherein each threshold detector means is connected to a separate one of the outputs of the said switching means, for generating a binary-signal output of a predetermined kind whenever an average of the pulse code signals applied to the one of the outputs of the switching means to which it is connected occurs within a predetermined range;

gate circuit means, comprising a plurality of gate circuits and having pulse code signal inputs separately connected to the said outputs of the said switching means, control inputs separately connected to receive the binary-signal outputs of the said plurality of threshold detector means, a polarity-bit signal output channel and at least one amplitude-bit signal output channel, for passing the pulse code signals developed on the separate outputs of the said switching means to separate output channels in cyclic order so that the pulse code signals applied to the one of the said threshold detector means which has most recently produced a binary signal output of the said predetermined kind will also be applied to a predetermined one of the output channels of the gate-circuit means; and decoder means, having a polarity-bit signal input connected to the said polarity-bit signal output channel and at least one amplitude-bit signal input connected to the said at least one amplitude-bit signal output channel of the said gate-circuit means, for reproducing the said analogue signal by generating a sequence of signals having their polarities determined by the signals applied to the said polarity-bit signal input and their amplitudes individually dependent on the bit signals applied to the said at least one amplitude-bit signal channel and also proportional to an average of the values of a sequence of the signals applied to at least one amplitude-bit signal channel.

* * * * *